(12) United States Patent
Pelletier

(10) Patent No.: US 6,244,420 B1
(45) Date of Patent: Jun. 12, 2001

(54) LUMBER POSITIONER WITH VERTICALLY ROTATABLE LATERAL DISPLACEMENT MEANS

(75) Inventor: Jean Pelletier, Plessisville (CA)

(73) Assignee: Carbotech Inc., Plessisville (CA)

( * ) Notice: Subject to any disclaimer, the term of this patent is extended or adjusted under 35 U.S.C. 154(b) by 0 days.

(21) Appl. No.: 09/336,727

(22) Filed: Jun. 21, 1999

(51) Int. Cl.⁷ .................................................. B65G 47/26
(52) U.S. Cl. ...................................... 198/456; 198/457.03
(58) Field of Search ............................ 198/456, 457.01, 198/457.02, 457.03, 457.05, 599, 636

(56) References Cited

U.S. PATENT DOCUMENTS

| 1,798,570 | 3/1931 | Wahl . | |
|---|---|---|---|
| 2,657,784 | 11/1953 | Stoker et al. . | |
| 4,143,755 | * 3/1979 | Keller | 198/456 |
| 4,256,222 | * 3/1981 | Gunti | 198/457.02 |
| 4,353,455 | * 10/1982 | Mumma et al. | 198/599 X |
| 4,386,641 | 6/1983 | Horn | 144/329 |
| 4,413,662 | 11/1983 | Gregore et al. | 144/356 |
| 4,541,520 | * 9/1985 | Greenlee, III | 198/457.03 X |
| 4,753,335 | 6/1988 | Goater | 198/456 |
| 5,390,778 | * 2/1995 | Ritola | 198/456 |
| 5,419,425 | 5/1995 | Goater | 198/461.3 |

* cited by examiner

Primary Examiner—James R. Bidwell
(74) Attorney, Agent, or Firm—Ronald S. Kosie; Robert Brouillette

(57) ABSTRACT

The present invention relates to lumber positioning or feeding systems to be used in saw mills, planing mills and the like in order to laterally displace lumber as it is being simultaneously advanced in the forward direction. In particular, the present invention is concerned with a lumber positioner apparatus for advancing lumber, which positioner comprises a vertically displaceable angling mechanism which may be selectively activated to cause lumber to be simultaneously displaced in a lateral direction, resulting in a vectorized movement of the lumber in order that the position of the lumber may be quickly and accurately controlled for further processing, such as cutting or trimming.

13 Claims, 5 Drawing Sheets

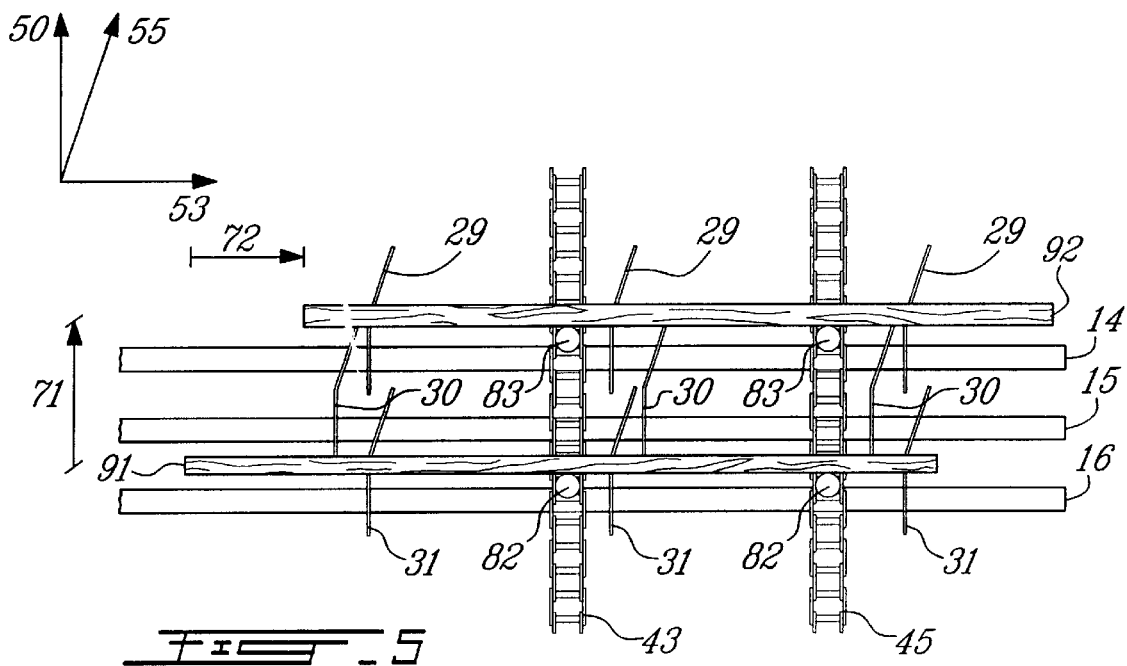
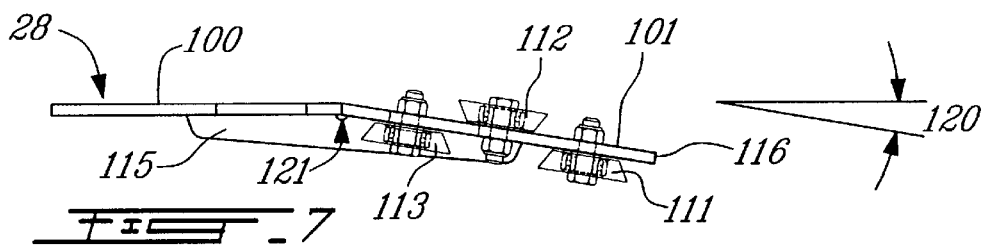
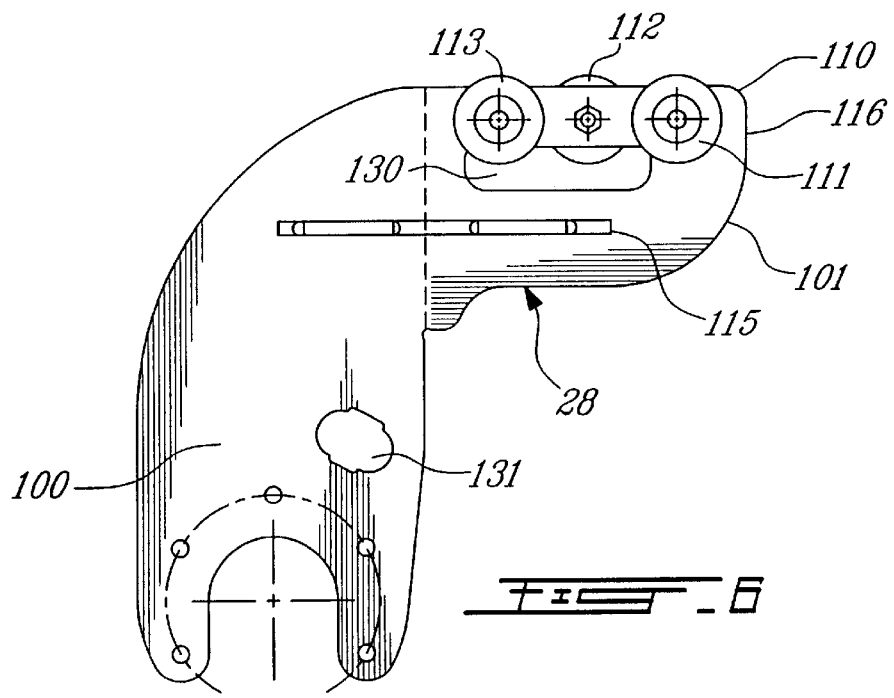

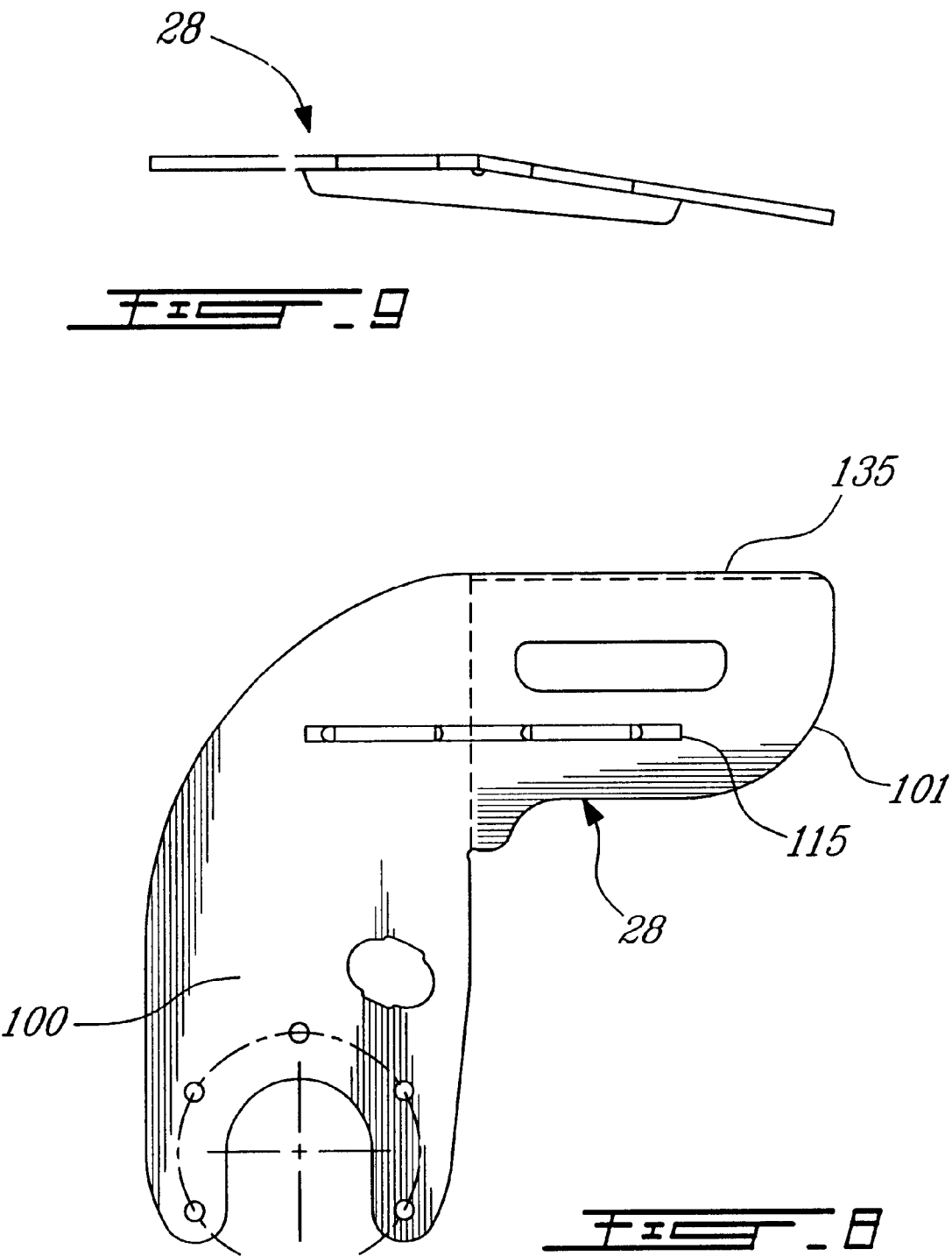

LUMBER POSITIONER WITH VERTICALLY ROTATABLE LATERAL DISPLACEMENT MEANS

BACKGROUND OF THE INVENTION

The present invention relates to the field of lumber positioning or feeding systems to be used in saw mills, planing mills and the like in order to laterally displace lumber as it is being simultaneously advanced in the forward direction. In particular, the present invention is concerned with a lumber positioner apparatus for advancing lumber, which positioner comprises a vertically displaceable angling mechanism which may be selectively activated to cause lumber to be simultaneously displaced in a lateral direction, resulting in a vectorized movement of the lumber in order that the position of the lumber may be quickly and accurately controlled for further processing, such as cutting or trimming.

In general, feeding or positioning systems in the saw mill industry are known in the art, for example U.S. Pat. No. 2,657,784 to Stoker, U.S. Pat. No. 4,386,641 to Horn, U.S. Pat. No. 5,419,425 to Goater, U.S. Pat. No. 4,413,662 to Gregoire, et al., and U.S. Pat. No. 1,789,570 to Wahl. In addition, positioning systems which lateraly displace pieces of lumber as they are simultaneously being moved forward are also known. These positioning systems however use mechanical means disposed along the lateral edges of the system, which mechanical means physically push (i.e. mechanically act) against an end portions of the lumber. For example moveable gates may be disposed along the lateral edges of said systems, which movable gates may be, for example, hydraulicly driven to push against a side end of a piece of lumber, such that the lumber is simultaneously displaced sideways as it is being moved in a forward direction.

However, the use of mechanical gates which act on the side ends of lumber is inefficient and slow, and may potentially be damaging to the lumber. Further, the speed at which lumber may be fed by such systems is dependant on the speed at which the mechanical gates can operate, meaning that a piece of lumber must be fully laterally displaced before the next piece of lumber can be introduced into the system. As a result, the overall speed and efficiency of such systems is not very high. Further, the use of mechanical (moveable) gates acting on the side ends of the lumber may result in jamming of the lumber and the gates, which may cause damage to the lumber and/or to the gates, which may result in wastage of lumber or downtime of the machine. In addition, the moveable gates, in order to be efficient, require complex control systems and driving systems, therefore increasing the manufacturing, operational and maintenance costs of such systems. Finally, such systems are unsuitable for lateral displacement of curved or warped pieces of lumber, as the gate may pass underneath the warped end, which may cause the piece of lumber to fly up and over the machine, and may therefore create a safety problem.

Prior attempt have been made at developing a positioning system for simultaneous lateral and forward displacement of lumber without the use of positioning gates. For example, U.S. Pat. No. 4,753,335 to Goater discloses a positioner comprising a straight deck and an angled deck, which positioner comprises various mechanisms for first lowering, then raising the straight deck. Said positioner further comprises dual driving means for advancing the lumber forward, namely one associated with the angled deck and one associated with the straight deck. The dual driving means have the disadvantage that they must always be perfectly synchronized in order that a piece of lumber may be advanced at the same rate along the angled deck and along the straight deck. As the angled deck comprises a straight section and an angled section, this means that the relative forward speeds of a piece of lumber on the angled section and on the straight portions of the angle deck are not always the same, and further, not always the same in relation to the forward speed of the straight deck. If at any time the synchronization between the advancing means of the angled deck and that of the straight deck is upset, the positioning system of Goater may not function. Further, dual advancing means result in needless additional purchasing, operating and maintenance costs, and needlessly complicate the aparatus.

A further major disadvantage of this patent is the fact that, in order to effect the lateral displacement of a piece of lumber, each piece of lumber must be imparted with two sudden vertical impulses, i.e. each piece of lumber must be subjected to two (quick) vertically displacements. Namely, the lumber is displaced vertically (downwardly) when the straight deck which initially carries the lumber is lowered below the level of the angled deck, such that the lumber is no longer carried by the straight deck, but rather is carried only by the angled deck. This therefore causes the lumber to be suddenly dropped. Once on the angled deck, the lumber is displaced laterally as needed. Following the lateral displacement of the lumber, the straight deck is raised once again above the level of the angled deck, and in the process raises (i.e. vertically displaces) the lumber off of the angled deck, to be supported by the straight deck. This therefore causes the lumber to be suddenly raised.

The positioner of Goater therefore causes each individual piece of lumber to be vertically displaced twice, therefore doubling the potential for positional innacuracy of the lumber. Further, the use of a movable straight deck which may be raised upwardly to come into contact with a piece of lumber from underneath creates operational constraints as the impact of said movable deck hitting up against a piece of lumber from below may impart an impact force and an acceleration to said piece of lumber, and therefore can cause the piece of lumber to jump up. As a result, the speed at which the straight deck moves up may be limited, so as to reduce said impact force, and therefore may reduce the accuracy of the lateral positioning of the piece of lumber. The upward displacement of the straight deck may therefore be done slowly and smoothly, which naturally is ill-suited for an industrial application where speed and efficiency is vital. The positioner of U.S. Pat. No. 4,753,335 has not met with commercial or operational success.

A further disadvantage of U.S. Pat. No. 4,753,335 is the fact that two advancing means are required. In addition to needlessly duplicating the number of advancing mechanisms, (i.e. one in relation with the angled deck and one in relation with the straight deck), the advancing mechanism in relation to the straight deck must be specially adapted to allow for the straight deck to be lowered, then raised, while the advancing mechanism continues to operate (i.e. to turn) uninterruptedly. A further disadvantage of the '335 patent is the fact that the positioner comprises a number of long (i.e. along the whole length of the positioner) heavy straight decks, which have to be be fully lowered, then raised. The use of long straight decks needlessly increase the weight of the straight deck to be displaced, with a corresponding decrease in the speed and efficiency of the positioner. Further, the long and heavy straight deck also necessitates the use of powerful raising means, increasing costs.

It would be therefore advantageous to provide a lumber positioner having a vertically fixed forward displacement mechanism (means) and a vertically rotatable (displaceable) mechanism (means) for selective lateral displacement of lumber being advanced thereon.

It would be further advantageous to provide a lumber positioner wherein, during the lateral displacement phase of each piece of lumber, the piece of lumber is subjected to only one sudden vertical displacement.

It would be further advantageous to provide a lumber positioner wherein the pieces of lumber are first fed into the lumber positioned by placing them on the vertically rotatable angling mechanism, and wherein once the lumber has been laterally displaced the required or desired amount, a portion of the vertically rotatable angling mechanism is rotated downwardly such that the lumber is displaced downwardly and supported on the advancing means for further forward displacement.

It would be further advantageous to provide a lumber positioner which comprises only one drive means, namely a drive means associated with the vertically fixed lumber advancing means.

It would be further advantageous to provide a lumber positioner which comprises a non motorized vertically rotatable lateral displacement means.

It would be further advantageous to provide a lumber positioner which allows for a very high sped of operation.

SUMMARY OF THE INVENTION

The present invention in accordance with a general aspect provides for a A lumber positioner for selectively forwardly advancing and laterally displacing lumber therethrough comprising
- a vertically fixed lumber advancing means for forwardly advancing lumber through the positioner, said advancing means comprising a plurality of spaced apart straight chain means, each of said chain means comprising a plurality of outwardly projecting attachments affixed thereon for imparting said lumber with motion through the positioner,
- a vertically rotatable lateral displacement guiding means for selectively laterally displacing and guiding said lumber, said lateral displacement guiding means comprising a plurality of spaced apart rotatable shafts, said rotatable shafts being rotatable between a first and a second rotated position, each said rotatable shaft comprising a plurality of angled plates affixed thereon, wherein said angled plates are configured and disposed such that when a rotatable shaft is in its first position, the uppermost surface of the angled plates affixed thereon are disposed above said chain means, and when said rotatable shaft is in its second rotated position, the uppermost surface of the angled plates affixed thereon are disposed below said chain means
- a drive means for forwardly driving said chain means
- rotation means for selectively rotating said vertically rotatable lateral displacement means
the positioner being configured and disposed such that when said lumber is to be laterally displaced, at least one rotatable shaft is disposed in its first position such that the lumber is
    simultaneously
        vertically supported and laterally guided in the direction of said angled plate by
        said upper surface of said angled plates, and
        advanced by said attachments,
and wherein when said piece of lumber has been forwardly and laterally displaced as required, a selected rotatable shaft is rotated to its second rotated position such that its said angled plates are downwardly displaced such that said upper surfaces of said angled plates are disposed below the chain means and such that said lumber is vertically supported by said chain means and only forwardly advanced by said attachments In accordance with a further aspect of the present invention there is provided for a A lumber positioner for selectively forwardly advancing and laterally displacing lumber therethrough comprising
- a vertically fixed, motorized, lumber advancing means for imparting motion to said lumber being advanced through said positioner, said lumber advancing means being configured and disposed such that it is in contact with said lumber irrespective of whether the lumber is being laterally displaced or not
- a vertically rotatable, non motorized, lateral displacement means for selectively laterally displacing said lumber, said lateral displacement means comprising a plurality of spaced apart rotatable shafts, said rotatable shafts being rotatable between a first and a second rotated position, said rotatable shaft comprising a plurality of angled plates affixed thereon, wherein said angled plates are configured and disposed such that when a rotatable shaft is in its first position, the uppermost surface of the angled plates affixed thereon are disposed above the lumber advancing means, and when a rotatable shaft is in its second rotated position, the uppermost surface of the angled plates affixed thereon are disposed below the lumber advancing means
- rotation means for vertically displacing said vertically rotatable lateral displacement means
the positioner being configured and disposed such that when said lumber is to be laterally displaced, at least one rotatable shaft is in its first position such that the lumber is
    simultaneously
        vertically supported and laterally guided in the direction of said angled plate by said upper surface of said angled plates, and
        imparted with motion by said lumber advancing means,
and wherein when said piece of lumber has been forwardly and laterally displaced as required, a selected rotatable shaft is rotated to its second rotated position such that its said angled plates are downwardly displaced such that said upper surfaces of said angled plates are disposed below said lumber advancing means and such that said lumber is vertically supported by said lumber advancing means and only forwardly advanced by said lumber advancing means.

In accordance with a further aspect of the present invention, there is provided for a:
A lumber positioner for selectively forwardly advancing and laterally displacing lumber comprising
- a lumber advancing means for advancing the lumber through the positioner, said advancing means comprising a plurality of spaced apart straight endless chains, each of said chain having an upper run and a lower run, and further comprising a plurality of outwardly projecting attachments affixed thereon for imparting said lumber with motion throughout the positioner,
- a plurality of a spaced apart rotatable shafts disposed intermediate said upper and lower run of said endless chains, each said shaft comprising a plurality of spaced apart angled plates affixed along the length thereof, said angled plates each comprising a wear surface disposed on the upper surface thereof,
- a single drive means associated with said lumber advancing means each said rotatable shaft being individually rotatable from a first to a second rotated position,
said angled plates being configured and disposed such that when each of said rotatable shaft is in said first position, said wear surface is disposed above said upper run and said lumber rest on said wear surface,
and wherein said lumber advancing means advances said lumber simultaneously forwardly through the positioner and in the direction of said angled plates,
wherein when in said second position, said shaft has been rotated such that said angled plates disposed along the length thereof have been rotated downwardly such that said lumber rest on said fixed deck and is advanced by the continuous lumber advancing means solely in the direction of the positioner.

In order to profitably operate a modern saw mill operation, a very large quantity of lumber must be processed, i.e. cut, trimmed etc . . . Accordingly, a very large number of pieces of lumber must be moved, i.e. advanced towards the cutting or trimming operation, while at the same time, the pieces of lumber may be sorted, and thus may require accurate, selective, lateral displacement. This simultaneous forward and lateral displacement of the lumber must preferably be effected as quickly and efficiently as possible. Typically, a saw mill operation may feed onto a positioner a continuous stream of rough lumber, for example 2×4's, 4×4's, 2×8's and so on, which pieces of lumber may be made to advance through the positioner in a direction perpendicular to the major longitudinal axis of the lumber. Each piece of lumber fed to (i.e. brought to) the positioner may be of a different length and cross-sectional area and may have one or two rough (i.e. uneven or uncut) side ends. Depending on the intended end-use of the lumber, said one or two rough ends may need to be trimmed in order to sell finished cut lumber. In addition, the lumber piece itself may need to be cut to appropriate lengths at one or more locations along its length, for example a rough 12 foot long piece of lumber may be cut into two 6 foot sections, or into one 8 foot section and one 4 foot section, or into a 12 foot section with a six inches piece of scrap and so on.

In order to maximise the efficiency of a saw mill, the individual pieces of lumber may not be sorted prior to their being fed to the positioner. Thus the lumber positioner of the present invention may be provided with various control systems, optical scanners, etc . . . which detect the arrival of rough lumber at one end i.e the feed end of the positioner and which control system may select, in accordance with pre-determined selection criteria, the most efficient use of a given particular piece of lumber. The control systems may be part of (i.e. integral with) the positioner or may be part of the overall control system of the saw mill. Therefore, each individual piece of lumber may be graded and selected to be cut in accordance with individual requirements, or in accordance with the most efficient utilization of the piece. Therefore, in accordance with various criterion, such as the position of the saw or saws at the exit end of the positioner, in accordance with the position of the lumber as it is deposited on the positioner, and in accordance with the cutting option as selected by the control system of the positioner, the positoner may advance each individual piece of lumber in one direction while at the same time be able to selectively, laterally displace each individual piece of lumber in accordance with the selected cutting pattern assigned to each individual piece of lumber. Further, the positioner may simultaneously, selectively laterally displace a plurality of pieces of lumber, wherein each piece of lumber may be selectively laterally displaced a different distance. For instance, the first piece of lumber may be selected to be laterally displaced six (6) inches, the following piece of lumber may be selected to be laterally displaced twelve (12) inches, the following piece of lumber may be selected to be laterally displaced eight (8) inches. All of, or part of, the lateral displacement of each of the successive pieces of lumber may occur at the same time, or successively. It is understood that some pieces of lumber may be selected to not be laterally displaced at all.

Therefore, in accordance with a general embodiment of the present invention, there is provided for a lumber positioner apparatus wherein, said positioner may advance pieces of lumber in a first (i.e. forward) direction, while at the same time allowing for selective, lateral displacement of each individual piece of lumber such that each may be positioned as required or desired. For example, the positioner may be configured and disposed such that simultaneous forward and lateral movement of individual pieces of lumber maybe effected, i.e. for example in the direction of further sawmill processing steps, such as trimming of rough ends or cutting to suit. In particular, the positioner in accordance with a general embodiment of the present invention may allow for the simultaneous (i.e. contemporaneous) positioning of a plurality of pieces of lumber, i.e. simultaneously laterally and forwardly displacing a plurality of individual pieces of lumber at the same time, yet wherein each piece of lumber may be laterally displaced a different distance (or alternatively, the same distance). As may be understood, the positioner may have three, four, five or more pieces of lumber thereon, disposed end to end or parallel to each other. For example, a piece of lumber may be laterally displaced 6 inches, while the next piece of lumber may be simultaneously laterally displaced 14 inches, the third piece of lumber may be simultaneously laterally displaced 3 inches, etc . . . In order to accomplish this simultaneous displacement, a piece of lumber may not be subjected to its lateral displacement until it is, for example, halfway down the positioner, at which point it may be laterally displaced, while a following piece of lumber which may only be a quarter of the way into the positioner may be simultaneously subjected to its own lateral displacement. Alternatively, the individual pieces of lumber may be laterally displaced sequentially, i.e. after one piece of lumber has been displaced laterally its required distance, the next piece of lumber may be laterally displaced its own required distance, then the third piece, etc . . .

In order to provide a fast, efficient and accurate positioning of the individual pieces of lumber, it may be advantageous to handle the individual pieces of lumber as little as possible, i.e. as few times as possible. For example, it may be preferable that each piece of lumber may be displaced in one direction (for example, forwardly) while minimizing the number of vertical displacements which may be required for selective lateral displacements thereof In particular, it may be advantageous to minimize the number of times that a piece of lumber is subjected to a quick, pulse-like vertical displacement. Thus in accordance with a particular embodiment of the present invention, there is provided for a lumber positioning apparatus (or positioner) wherein the lumber to be selectively, laterally displaced is, once it is disposed on the vertically rotatable angling mechanism, may be subjected to only one vertical displacement.

Thus in accordance with a particular embodiment of the present invention, there is provided for a lumber positioner comprising a vertically fixed advancing means, and a vertically rotatable (i.e. displaceable) lateral displacement mechanism (i.e. means) for selective lateral displacement of each piece of lumber. The advancing means may be a fixed advancing means (i.e. vertically fixed), wherein said advancing means provides forward displacement of the lumber, without providing lateral displacement, or vertical displacement of the lumber. In accordance with its simplest form, the advancing means may, for example, comprise one or more spaced apart chain means, which chain means, may comprise an endless chain, endless belt, conveyor or any other means adapted to provide a continuous, returning motion about two spaced apart pulleys. The chain means, i.e. the endless chain may, in accordance with a particular embodiment of the present invention, may be a straight chain. The expression "straight chain" is understood to mean that the chain may not be curved or angled in the horizontal plane. This may be so in order to ensure that the forward speed of the chain may always be constant, i.e. the speed of the chain in the direction of movement of the positioner.

Each chain means may be fitted with a plurality of attachments thereon. The attachments may be fixed to each of said chains through known means, such as for example, welded, bolted, etc . . . and are configured such that they extend outwardly from the chain about its periphery. The chains may be supported along their lengths in any manner, such as for example, by a beam, rail or other support means, may be spaced apart by opposed pulleys, gears etc . . . and may be rotatably driven by a sprocket, gear wheel, or other means. The positioner may comprise a drive means, such as an electric motor to forwardly drive the chain means. As may be understood, in accordance with a particular embodiment of the present invention, the positioner may comprise a motorized, i.e. driven advancing means, which motorized advancing means is the sole means of imparting motion to the pieces of lumber disposed on the positioner. The chains being continuous (i.e. endless), once the forward displacement of their upper side has occurred, the chains, are made to come back, i.e. their lower side is displaced back to the beginning of the positioner.

In accordance with a particular embodiment, the advancing means may comprise a plurality of (substantially) parallel, spaced apart continuous (endless) chains, spaced apart from each other a distance sufficient to allow for the forward displacement of lumber, yet close enough to allow for small pieces of lumber to be advanced as well. As may be understood, the advancing means may alternatively or in addition to the endless chains comprise belts, conveyors, etc . . . The advancing means may be supported on the frame of the positioner and may be provided with the required bushings, bearings, supports, fixations and control mechanisms etc . . . to accomplish its intended purpose. As mentioned above, each of the spaced apart continuous chains may be provided with a plurality of spaced apart attachments thereon, the longitudinal spacing of the attachments to be determined in accordance with the requirements of the positioner, such as rate of feed of the lumber, speed, type of lumber to be sorted, etc . . . As may be understood, the spacing of the attachments on each of the spaced apart chains may be identical. Further, each of the chains may be driven by its own sprocket, gear wheel, etc . . . which sprockets may be in turn rotatably driven by a common shaft or other drive means, such that the rate of forward movement of each chain, of each attachment, and consequently of each piece of lumber advanced thereon may be the same.

As may be understood, the advancing means is vertically fixed (i.e. it is not vertically displaceable) and therefore may cause no vertical displacement of the pieces of lumber being advanced thereon, or thereby. Further, in accordance with the present invention, the advancing means may provide the forward displacement of each of the pieces of lumber, regardless of whether the pieces of lumber are being only forwardly advanced, or alternatively, whether they are simultaneously being forwardly advanced and laterally displaced. As may be understood, there may be no second advancing means, for example, associated with the vertically rotatable advancing means, and a piece of lumber being simultaneously forwardly advanced and laterally displaced, may be driven (i.e. imparted with motion) only by the advancing means, even though it may be forwardly and laterally displaced. As may be further understood, the rate of forward displacement of a piece of lumber may therefore always be constant, from the feed end to the exit end of the positioner, regardless if lateral displacement is also imparted on a piece of lumber.

In addition to the advancing means, the lumber positioning apparatus of the present invention may further comprise a vertically rotatable (i.e. displaceable) lateral displacement means, or angling mechanism. It is understood that the expression angling mechanism means the means by which the pieces of lumber may be made to be laterally displaced, i.e. wherein in addition to being advanced, they may be "angled" , i.e. directed to move in a lateral direction. The vertically rotatable lateral displacement means may selectively provide for the lateral displacement of individual pieces of lumber as each piece of lumber is being simultaneously advanced by the advancing means. It is understood that the expression "selectively" means that each piece of lumber may or may not be laterally displaced, and further, that each successive piece of lumber, if displaced, may be laterally displaced a different distance. In accordance with a general embodiment, the vertically rotatable lateral displacement means comprises a plurality of spaced apart, rotatable shafts, which shafts may be disposed transversaly to the direction of the advancing means, i.e. transversaly to the direction of the continuous chains. Each rotatable shaft may be supported on the frame of the positioner and may be provided with the required bushings, bearings, supports, fixations etc . . . to accomplish its intended purpose. Each rotatable shaft may have affixed thereon a plurality of spaced apart, (short) angled plates, which angled plates may be disposed generally at right angle to the rotatable shafts, and oriented so as to generally point in the direction that the pieces of lumber are to be displaced. The angled plates may comprise two sections, namely a straight section (i.e. through which the angled plate may be affixed to the rotatable shaft), followed by an angled section, which angled section is connected to the straight section at an angle thereto. The angle between the straight section and the angled section of the angled plates may for example be 15°, however it is understood that the angle between the straight section and the angled section may be greater or smaller. It is further understood that the angle between the straight section and the angled section of the angled plates, may be (in part) determinative of the rate of lateral displacement of the lumber being laterally displaced thereon. Thus, if the plate is angled at a steeper angle, say 25°, then the lateral displacement rate may be greater, and if the angle is lower, i.e. 10°, then the lateral displacement rate may be lower.

The plurality of rotatable shafts of the vertically rotatable lateral displacement means may each be disposed bellow the level of the upper run of the chains of the (vertically fixed) advancing means, i.e. the rotatable shaft may be disposed intermediate the upper run and the lower run of the continuous (i.e. endless) chains. In accordance with a general embodiment of the present invention, the vertically rotatable lateral displacement means may be displaceable between a first position and a second rotated position, namely wherein each of the rotatable shafts may individually and independently of each other be displaceable between a first position and a second rotated position. The angled plates affixed onto each of the plurality of rotatable shafts may correspondingly be configured such that when a rotatable shaft is in its first position, the angled plates affixed thereon may be in a first (or raised) position, such that the top surface of each of the angled plates is disposed above the upper surface of the chain (or chains) of the advancing means. When in said first position, the angled plates maybe disposed such that apiece of lumber disposed (i.e. resting) on the top surface of the angled plates may not be in contact with the chains of the advancing means. Thus as may be understood, when the angled plate is in the first position, the lumber may only be in contact with the top surface of the angled plate, and its vertically disposition (i.e. height) may only be determined by the vertically rotatable lateral displacement means, i.e. the angled plates of one or more rotatable shafts.

Further in accordance with this general embodiment, the angled plates affixed onto the rotatable shafts may be configured and disposed such that, when the rotatable shafts are disposed in the second rotated position, the angled plates affixed thereon may also be in a second rotated (i.e. lower) position, such that the top surface of the angled plates may be disposed below the level of the upper surface of the chains of the advancing means. Thus, when the angled plates are being rotated to their second rotated position, a piece of lumber which may have been carried on the upper surface of the angled plates, may be vertically displaced downwardly, such that after a sufficient rotation of the angled plate (i.e. to the point where the angled plate are disposed below the upper level of the chains), the piece of lumber may now be supported only by the upper surface of the chains of the advancing means.

As may be understood, due to the fact that the angled plates may, when the lateral displacement means is in the first (or raised) position, be disposed above the chain of the advancing means, it may therefore be necessary for the attachments of the advancing means (which are affixed to the chains) to be configured such that they are long enough so that they extend upwardly well above the upper surface of the angled plates. Therefore, as mentioned above, when a piece of lumber is disposed on and supported by the top surface of the angled plates (i.e. and therefore not in contact with the chains of the advancing means) the (long) attachments extending from the chains may nevertheless be of sufficient length so as to come into contact with the lumber and provide for a continuous advancement thereof in a forward direction. As described above, the vertically rotatable lateral displacement means may not be provided with or associated with an advancing means, and therefore the displacement of the lumber through the positioner may only be accomplished by the action of the attachments of the advancing means pushing on the lumber.

Therefore, in accordance with a particular embodiment of the present invention, the positioner may comprise only one means for imparting motion to the lumber, that being the advancing means. Thus as may be understood, the vertically rotatable lateral displacement means is not associated with and is not provided with any form or manner of movement (i.e. forward or lateral) inducing mechanism, it simply performs a supporting and a guiding function. If a piece of lumber is not otherwise imparted with motion (i.e. by the advancing means), the guiding function (i.e. horizontal guiding function) of the vertically rotatable lateral displacement means would be ineffective, i.e. unused.

When in use, the positioner of the present invention may therefore be configured and disposed such that the vertically rotatable displacement means (i.e. angling mechanism) may impart selective, lateral displacement of each of the pieces of lumber, and further, that the vertically rotatable angling means may, once the lateral displacement of the lumber has taken place, effect a downwardly vertical displacement of the lumber onto the advancing means. As may be understood, the individual pieces of lumber may be fed to or brought to the position in any known manner, such as a conveyor belt, etc. The lumber may be scanned through an optical scanner or other means of a known type, which together with appropriate computer hardware and/or software connected thereto, ascertains what, if any, lateral movement of the individual pieces of lumber will be require for maximum efficient utilization thereof. The scanning mechanism may be part of (i.e. integrated with) the positioner, or alternatively, may be integrated with of other equipment. The positioner may be configured and disposed such that the individual pieces of lumber being advanced thereon do not have to be aligned along one edge of the positioner. For example, if the positioner is 15 feet wide, two (2) pieces of lumber each having 6 feet in length, may be axially aligned and advanced through the positioner simultaneously, wherein each piece of lumber may be individually, and independently of the other, be laterally displaced its required or desired distance, i.e the first piece 6 inches and the second piece 18 inches. Further, a single piece of 12 foot lumber may be introduced such that it is disposed completely to the left of the positioner, i.e. wherein there is, for example, a three (3) foot gap between the right side end of the lumber and the right end of the positioner. Alternatively, apiece of lumber may be placed completely to the right of the positioner, or in the middle of the positioner.

Thus when a piece of lumber is introduced into the positioner, it has either already been determined what lateral displacement, if any, is required, or such determination may be accomplished early into the displacement of the lumber in the positioner. As described above, the vertically rotatable lateral displacement means is displaceable from a first or raised position to a second or lowered position. If the optimizer determines that a particular piece of lumber requires lateral displacement, the piece of lumber may be advanced such that it is disposed onto the rotatable lateral displacement means, i.e. the rotatable lateral displacement means may be in its first (i.e. raised) position. Thus, upon the introduction of the particular piece of lumber onto the positioner, the lumber may be made to rest on, and be supported by the upper surface of the angled plates of the first rotatable shaft of the vertically rotatable lateral displacement means. At this point, (i.e. at the feed end of the positioner), if the piece of lumber has been selected for lateral displacement, the lumber may be supported only on the upper surfaces of the angled plates and not by the chains of the advancing means. The displacement (i.e. the imparting of motion to the lumber) is accomplished by the advancing means, namely the attachments which are disposed on the chains of the advancing means, which cause the piece of lumber to be advanced forward, i.e. the attachments push the piece of lumber from behind and make it advance down the positioner. As may be understood, the vertically rotatable mechanism does not provide any displacement force, it simply supports and directs the movement of the piece of lumber, while the imparting motion to the pieces of lumber may be accomplished by the advancing means.

As the vertically rotatable lateral displacement means is in its first or raised position, the lumber may be made to advance in the direction of the angled plated on which it is supported. Thus if the angled plate has an angled section which is at a 15° from the perpendicular, the lumber may also advance at a 15° from the perpendicular. In other words, the piece of lumber may move forwardly, but also laterally at an angle substantially the same as the angle of the angled plate, in this example, 15° from the forward direction.

Each successive set of angled plates affixed on successive rotatable shafts may therefore laterally displace a piece of lumber a further distance. For example, if an angled plate is angled such that it causes a piece of lumber to be laterally displaced two inches, then a piece of lumber requiring a total lateral displacement of 12 inches may need to be advanced on and supported by, for example, six (consecutive or not) rotatable shafts having angled plates affixed thereto. It will be readily apparent that when small lateral displacements are required, there is an advantage to having a positioner with a plurality of rotatable shafts each with small angled plates affixed thereon, wherein only some of the rotatable shafts need be rotated, rather than one single large piece of equipment, or the whole deck, as per the teachings of the prior art.

Once the optimizer, or any other control and instrumentation device, determines that a piece of lumber has been laterally displaced the required distance, part of the vertically rotatable lateral displacement means may be activated, i.e. one or more rotatable shafts may be rotated, causing the angled plates affixed thereon to be rotated downwardly, i.e. from their first to their second rotated (or lower) position, such that the lumber which was previously resting thereon may be brought down onto and rests upon the advancing means. Typically the rotatable shaft to be rotated would be the next rotatable shaft after the last rotatable shaft which effected a lateral displacement of the lumber. Thereafter, the lumber may be displaced in the forward direction while being supported on the chains of the advancing means. As maybe understood, only a small number of rotatable shafts, i.e. one, two or three out of a total of, for example, 12 or 15, may be needed to be rotated in order to end the lateral displacement of a piece of lumber.

For example, a positioner in accordance with the present embodiment may comprise a number of spaced apart parallel rotatable shafts disposed perpendicularly to the direction of motion of the lumber to be advanced through the positioner. The pieces of lumber are introduced onto the positioner, such that they may roughly be parallel to said rotatable shafts. When the vertically rotatable advancing mechanism is in its first or raised position, one or more, or all of said rotatable shafts may be in their first or raised position, such that the top surface of each of the angled plates attached thereon may be disposed above the upper level of the advancing means. Thus, the lumber, when it is first introduced in the positioner, is first supported by the plurality of angled plate disposed on the first rotatable shaft, i.e. the rotatable shaft adjacent to the feed end of the positioner. The lumber may also simultaneously be supported on the angled plates affixed to the second or third rotatable shaft, if for example there is overlap between the angled plates affixed to the first, second, third rotatable shafts. As the lumber is vertically supported by the angled plates, yet advanced by the advancing means, the configuration of the angled plates, will cause the piece of lumber to be guided or angled, i.e. advanced forwardly and also simultaneously laterally displaced. As may be understood, the lumber may be moved, i.e. guided in a manner which may generally follow the shape of the angled plates on which it is supported. For example, if an angled plate is angled at 15° and its angled portion measures 6 inches, the forward most end of the angled plate may be laterally offset by 1.55 inches. Therefore, a piece of lumber resting on and being guided by an angled plate may be forwardly displaced 6 inches, and laterally displaced a distance of 1.55 inches.

Once said lateral displacement and forward displacement are accomplished, the lumber may now be supported by the next series of angled plates which may be affixed to the second rotatable shaft, and said second rotatable shaft may further cause the simultaneous forward and lateral displacement of the lumber, for example a further forward movement of 6 inches and a further lateral displacement of 1.55 inches. These steps are repeated until the optimizer or other controlled mechanism determines that the required or desired lateral displacement of the lumber has been accomplished. Once this has been done, the vertically rotatable lateral displacement means may be activated, such that one or more of the rotatable shafts may be rotated to its second rotated (or lowered) position. Said rotation of said rotatable shaft may cause the lumber to drop, for example haft an inch, the distance necessary for said lumber now be supported by the upper surface of the andvancing means, i.e. for example, the endless chains.

As may be understood, the angled plates may be configured and disposed such that they comprise a ramp up portion onto which the lumber may be made to ramp up. Therefore, as may be understood, this may constitute a preliminary vertical displacement of the lumber onto the vertically rotatable advancing mechanism. However it is understood that this vertical displacement may be a smooth and gradual displacement, without jerks, impacts or impulses. This vertical displacement or ramping up may therefore not negatively impact the positioning accuracy of the lumber. However, in accordance with a further embodiment of the present invention, the lumber may be deposited directly onto the vertically displacement advancing means, therefore, avoiding the need for the lumber to be ramped up thereon.

Therefore, as may be understood, if the vertically rotatable lateral displacement means comprises, for example 12 spaced apart parallel rotatable shafts, the vertical displacement of a piece of lumber may be effected by the rotation of one (or more) of said 12 rotatable shafts. This may mean that a rotatable shaft may be in its second rotated position, while a previous rotatable shaft may still be in its first or raised position accomplishing a lateral displacement of a following piece of lumber. As may be understood, said vertically rotatable lateral displacement means is therefore advantageous in that not all of the rotatable shafts need to be activated (i.e. rotated from a raised to a lowered position and vice versa) at the same time, each of individual piece of lumber may be caused to be vertically displaced independently of the next one at any point along the positioner.

Thus by minimizing the number of vertical movements which may be imparted on a piece of lumber, the accuracy, (i.e. the lateral positioning accuracy) of each piece of individual lumber may not be compromised by unnecessary movements. As may be understood, each time that a piece of lumber is displaced from one moving surface to another surface, whether fixed or moving, there may always be a possibility of said piece of lumber being imparted with an acceleration or deceleration force, which may caused it to bounce, skip, move, etc . . . and therefore introduce inaccuracy into its positioning. This may especially be the case in fast moving machines. The present invention overcomes this shortcoming of the prior art. Thus as may be understood, in accordance with a particular embodiment of the present invention, the individual pieces of lumbers undergoing lateral displacement may be subjected to a single vertical movement, namely from a first position to a second rotated (lowered) position. There is therefore no up and down or vertically cyclical movement of the lumber.

Thus as may be understood, by multiplying the number of (short) angled plates, the positioner may at the same time be displacing a number of piece of lumber wherein each piece of lumber may be laterally displaced a different length. This may be accomplished by having the control system of the positioned select a piece of lumber for a given lateral displacement, but may order the positioner to start lateraly displacing that piece of lumber only when that piece of lumber is already, for example, half way down the positioner.

BRIEF DESCRIPTION OF THE FIGURES

The present invention will be further understood from the following description with reference to the drawings in which:

FIG. 5 is a close up view of a plan view of the positioner as shown in FIGS. 3 and 4.

FIG. 6 is a close up view of a side elevation of an angled plate.

FIG. 7 is a top plan view of the angled plate of FIG. 6.

FIG. 8 is a side elevation view of an alternative embodiment of an angled plate.

FIG. 9 is a top plan view of the angled plate of FIG. 8.

DETAILED DESCRIPTION OF THE FIGURES

Figure 1:
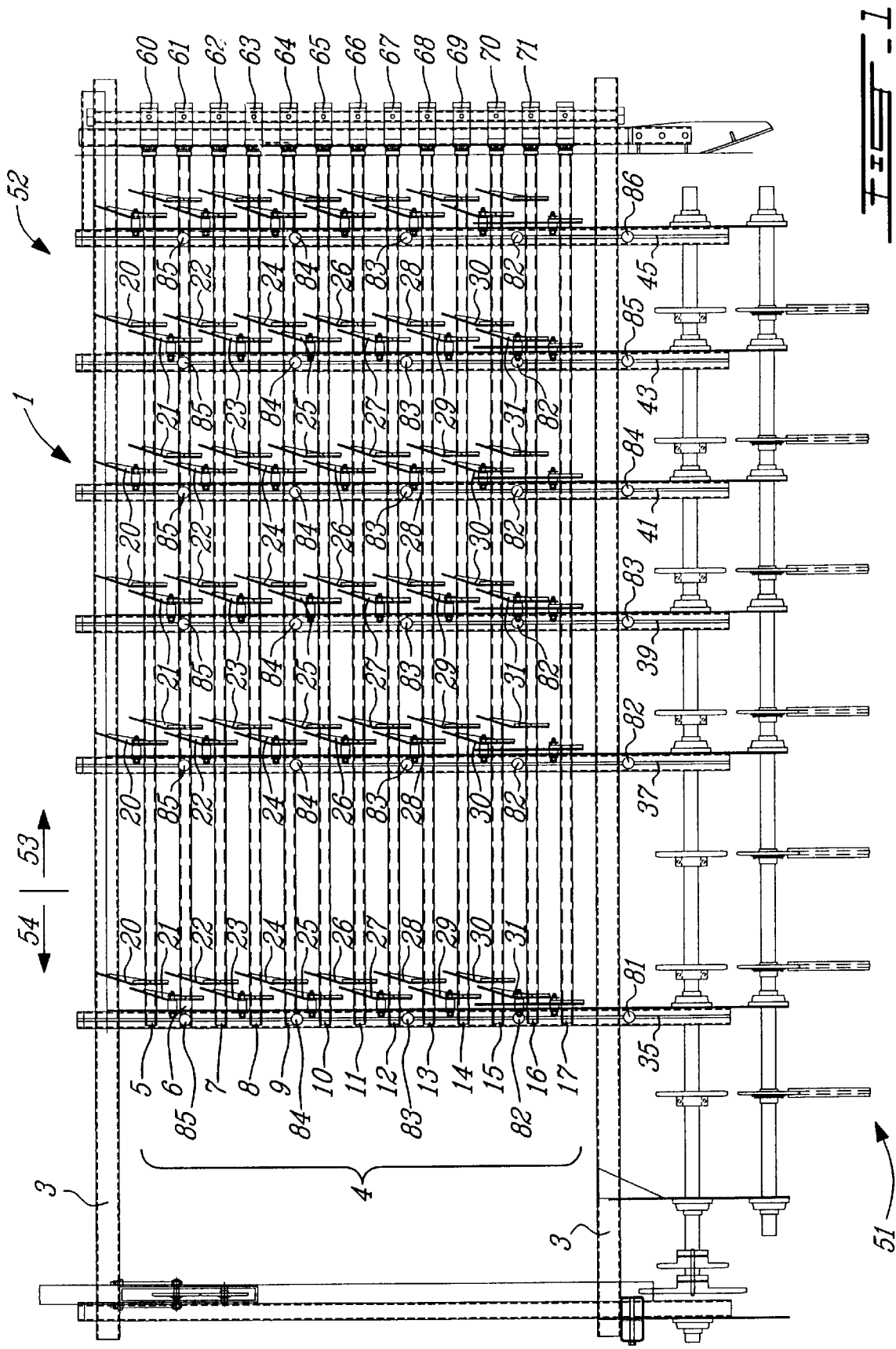
FIG. 1 is a top plan view of the lumber positioner in accordance with a general embodiment of the present invention.

The lumber positioner 1 in accordance with a general embodiment of the present invention is shown in FIGS. 1 to 5. FIG. 1 illustrates a top plan view of a lumber positioner 1 with a vertically rotatable lateral displacement means designated generally by reference number 4. The positioner 1 comprises a frame 3, which frame is supported on legs 2. The vertically rotatable lateral displacement means 4 comprises a plurality of spaced apart, substantially parallel rotatable shafts 5, 6, 7, 8, 9, 10, 11, 12, 13, 14, 15, 16, and 17, wherein each of said rotatable shafts 5 to 17 is supported on elements of the frame 3 with appropriate bearings, bushings, supports, etc . . . . As shown, each of said rotatable shafts 5 to 17 is disposed roughly parallel to each other, and also transversely to the direction of travel of the lumber, denoted by motion arrow 50. It is understood that the number of parallel shaft may be greater or smaller than that shown, in accordance with the customized requirements of the particular positioner. For reasons of clarity, the positioner 1 shown in FIG. 1 does not have any lumber thereon, but it is understood that the lumber is to be introduced from the feed end 51 of the positioner 1, and is to exit from the exit end 52 thereof, and that the forward direction of the lumber referred to herein is indicated by motion arrow 50. It is further understood that the lateral displacement of the lumber referred to herein is indicated by motion arrow 53, but it is understood that if the positioner 1 is configured differently, the lateral displacement of the lumber referred to herein could be indicated by motion arrow 54. It is further understood that a lumber positioner could be adapted such that lateral displacement of lumber could be effected, for example, in the direction of motion arrow 53 and later in the direction of motion arrow 54. For example, if a given piece of lumber is laterally displaced (in the direction of motion arrow 53) a greater distance than was required, then a corrective displacement in the direction of motion arrow 54 could be effected, for example, with the last rotatable shaft 5.

The vertically rotatable lateral displacement means 4, in addition to comprising rotatable shafts 5 to 17, further comprises a plurality of angled plates 20, 21, 22, 23, 24, 25, 26, 26, 27, 28, 29, 30, and 31 respectively affixed along the length of each of said rotatable shafts 5 to 17. As shown in the present embodiment, rotatable shaft 5 comprises, for example, six (6) angled plates, identified by the reference number 20, wherein each of said five angled plates 20 is spaced apart along the length of said rotatable shaft 5. As illustrated in FIG. 1, each rotatable shaft 5 to 17 comprises an identical number of angled plates, respectively 20 to 31 affixed along the length thereof. It is understood that the number of angled plates which may be affixed along the length of each of said rotatable shafts may vary in accordance with the customized design of a particular positioner 1, and further, the disposition of the angled plates may be varied, for example, they may be staggered, or disposed in an alternating or offset manner.

The configuration of each of the angled plates 20 to 31 affixed respectively onto rotatable shafts 5 to 17, is such that the distal end of each said angled plates (as further seen in FIGS. 7 and 9) is angled towards the right as seen from above, i.e. in the direction of motion arrow 53 as seen in FIG. 1. As mentioned above, the displacement of the individual pieces of lumber as they are advanced in the direction of motion arrow 50 is therefore to be in the right hand direction as denoted by motion arrow 53. It is understood however, that in accordance with an alternative embodiment of the present invention, there may be provided for a vertically rotatable lateral displacement means wherein the angled plate (20 to 31 may be configured such that the distal end thereof is pointed toward the left as seen from above, i.e. in the general direction of motion arrow 54).

The vertically rotatable lateral displacement means 4 comprising rotatable shafts 5 to 17, may be rotatably displaced from a first to a second rotated position (as further shown in FIGS. 3 and 4), and each of said rotatable shaft may be powered by motor means designated by reference numerals 60 to 71. As shown, the motor means 60 to 71 may comprise pneumatic activators which may be air driven, and which action causes the rotatable shaft to push against a resistance mechanism such that the default setting of each of said rotatable shaft may be its first or raised position. Alternatively, the default position of the rotatable shafts may be in the second rotated position. It is understood that motor means 60 to 71 may alternatively comprise hydraulic levers, electro-magnetic means or other types of motors or drive means wherein the angled plates of the rotatable shafts are rotatable from a first to a second position. It is understood that motor means 60 to 71 do not impart the pieces of lumber being advanced on the positioner 1 with any displacement in the direction of motion arrows 50 53 and 54, but will only serve to vertically rotate the rotatable shafts 5 to 17.

As further illustrated in FIG. 1, there is shown the advancing means shown by continuous (i.e. endless) chains 35, 37, 39, 41, 43 and 45. Disposed along the length of each of said continuous chains 35, 37, 39, 41, 43 and 45, there is shown attachments 81, 82, 83, 84 and 85. As may be understood, the series of attachments 81 may for example, accomplish the displacement of one or more pieces of lumber, not shown.

Figure 2:
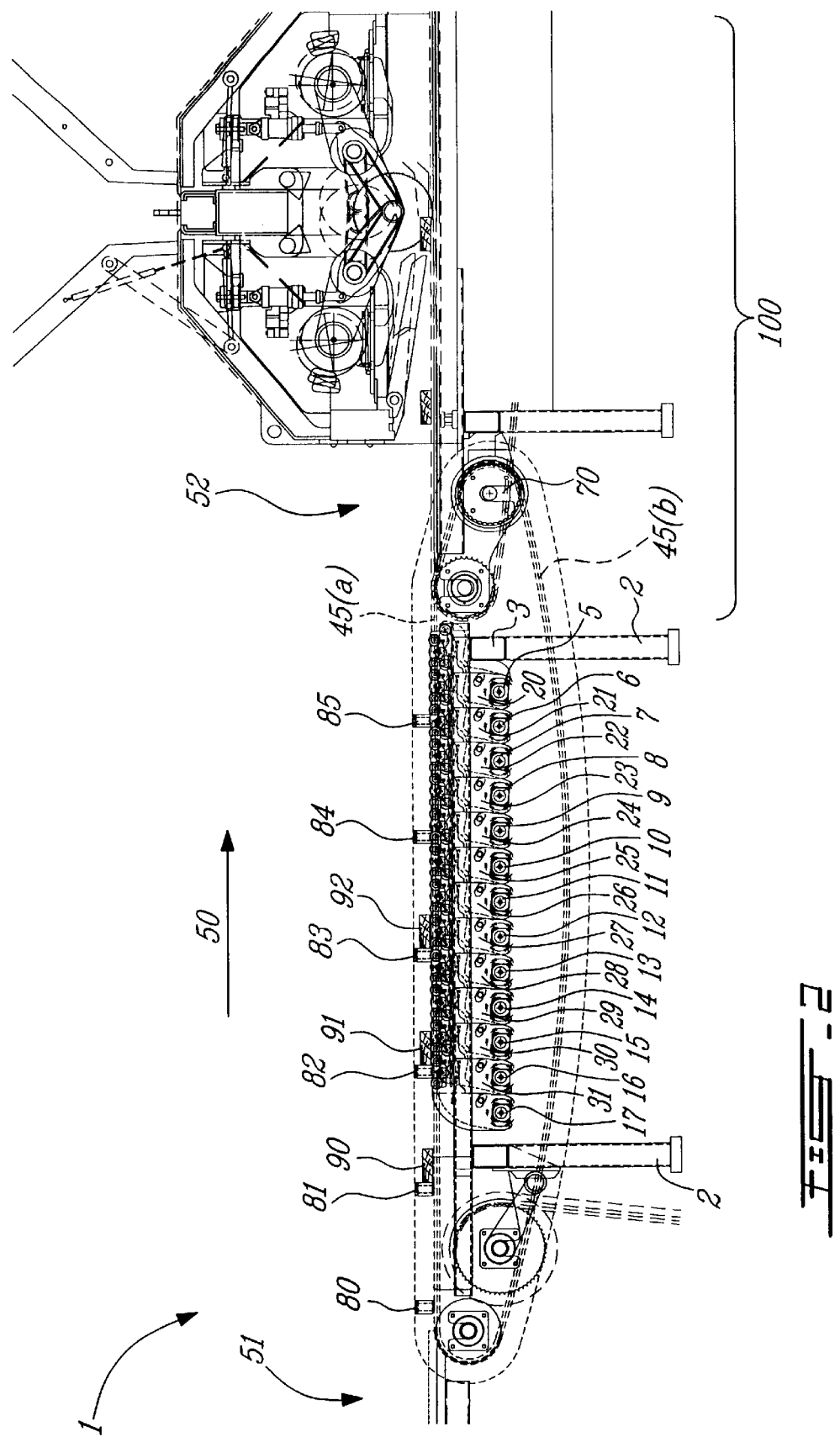
FIG. 2 is a right side elevation view of the positioner FIG. 1 showing in addition thereto a number of pieces of lumber being advanced on the positioner.

FIG. 2 illustrates a side end elevation view of the positioner 1 as shown in FIG. 1. In addition to the positioner 1 illustrated in the plan view of FIG. 1, FIG. 2 comprises a number of pieces of lumber designated by reference number 90, 91 and 92, each shown being advanced in the direction of motion arrow 50, from the feed end 51 to the exit end 52 of the positioner 1. As may further be seen, the exit end 52 of the positioner 1 is operationally coupled to a sawing station 100, while the feed end 51 includes a prior step in the manufacturing chain, i.e. a feeding means. Lumber piece 90 is shown being advanced by attachment 81, which attachment 81 is affixed to one of the chains of advancing means (i.e. chain 45 as shown in FIG. 1, or as further illustrated in FIGS. 3 and 4). As may be further seen in FIG. 1, there may be a number of attachments 81 each one of which are affixed to a different chain of the advancing means 4. Lumber pieces 91 and 92 are shown as being advanced by attachments 82 and 83, while attachments 84 and 85 are, for illustration purposes, shown not to be advancing any lumber.

As may be further seen, the positioner 1 comprises a number rotatable shafts 5 to 17, onto which there are affixed angled plates 20 to 31 (as also seen in FIG. 1). As illustrated, each of the angled plates is positioned in its first (i.e. raised) position. The advancing means of the postioner further comprises a gear or sprocket 70 which may be operably connected to chain 45, which sprocket is mounted on a transmission shaft, and which rotation causes the advancement ofupper run 45(a) of chain 45 in the direction of motion arrow 50 and further, causes the advancement of the lower run 45(b) of chain 45 in the opposite direction. As may be understood, each of the other chains 35, 37, 39, 41 and 43 (as shown in FIG. 1) may be similarly operationally connected with a sprocket, and each of the sprockets may be mounted on a common transmission shaft such that they may each have the same displacement in the direction of motion arrow 50.

Figure 3:
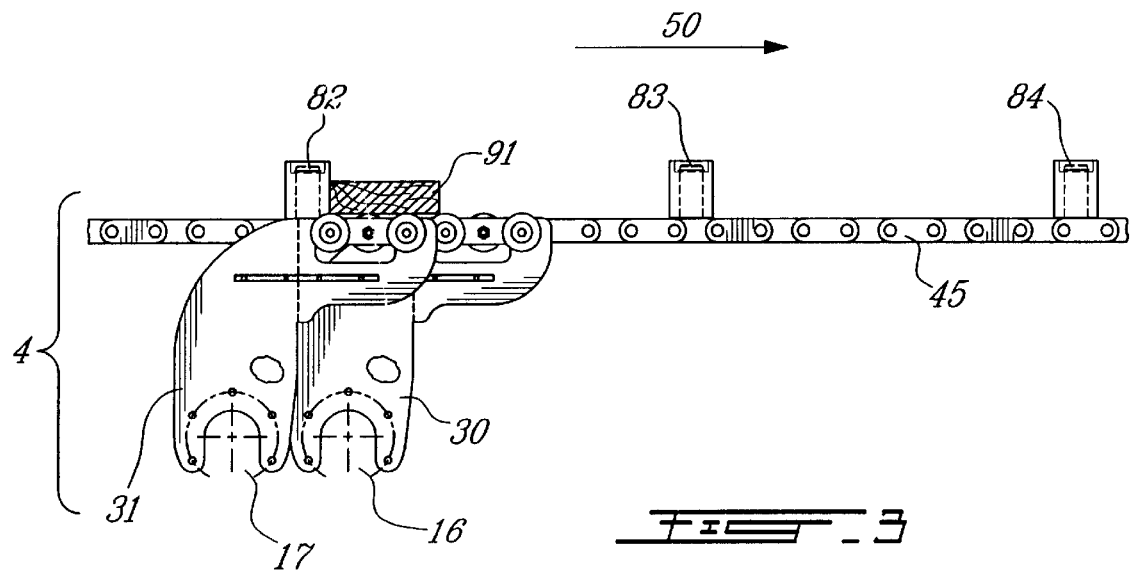
FIG. 3 is a partial close up view of the side elevation of the positioner as shown in FIG. 2.

FIG. 3 illustrates a close up of a portion of the positioner 1 of FIG. 2, wherein only a portion of the advancing means and of the vertically rotatable lateral displacement means 4 are shown. Angled plates 30 and 31 of the vertically rotatable lateral displacement means 4 are shown to be disposed in their first (raised) position, wherein piece of lumber 91 is shown to be disposed and resting on the upper surfaces of said angled plates 30 and 31. As may be seen, the upper surface of angled plates 30 and 31 are disposed such that they are higher than the upper surface of chain 45, and therefore, when the angled plates 30 and 31 are in their first or raised positions, piece of lumber 91 is not supported by the upper surface of chain 45 of the advancing means. Attachments 82 which is affixed on advancing means (i.e. onto chain 45) is shown to be high enough, such that even when the lumber 91 is not supported by the chain 45, it can push against the piece of lumber 91 and cause it to be advanced in the direction of motion arrow 50. Further, attachment 82 is rotationally free (i.e. free-turning), such that it can turn about its axis unimpededly, meaning that as it is pushing lumber 91 forward in the direction of motion arrow 50, it does not offer any resistance to the lateral movement of lumber 91, for example in the direction out of the page, or to the right as depicted by motion arrow 53 of FIG. 1.

As may be seen in FIG. 3, the piece of lumber 91 is only imparted with movement through attachment 82, (i.e. through chain 45 of the advancing means) but it is guided in its direction of travel by the configuration and disposition of angled plates 30 and 31. Thus, as may be understood, when the angled plates 30 and 31 are in their first or raised position, lumber 91 is caused to move (it is imparted with motion) by one mechanism, namely the advancing means, but it is guided in its direction of travel by the angled plates of the vertically rotatable lateral displacement means.

Figure 4:
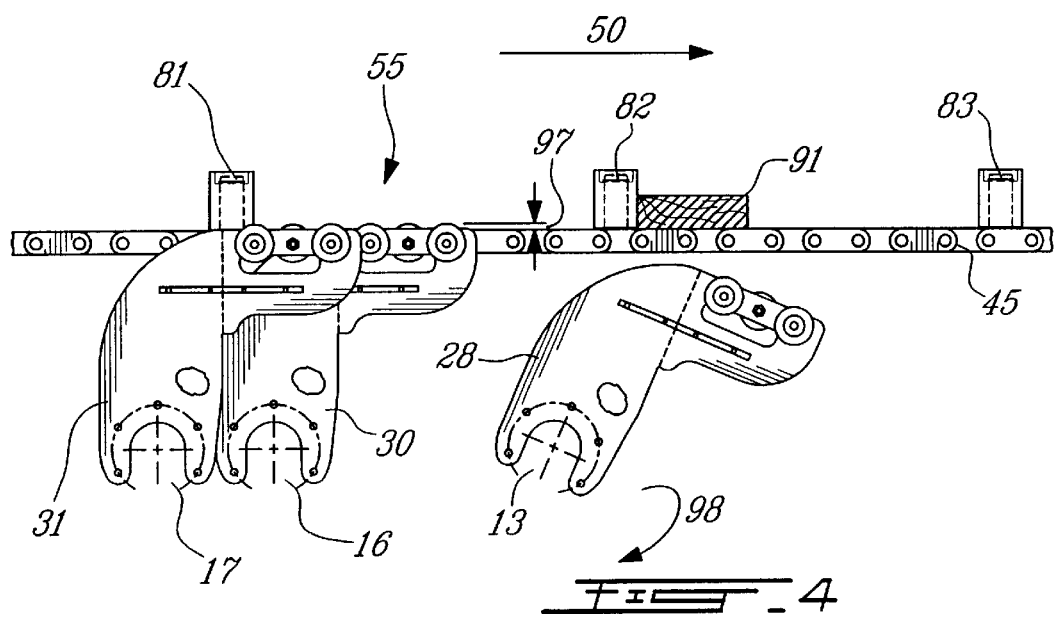
FIG. 4 is a further close up of the side elevation view of the positioner as shown in FIG. 2.

FIG. 4 is a further close up of the side elevation view of the positioner 1 shown in FIGS. 2 and 3 again showing a further displacement of lumber 91 in the direction of motion arrow 50.

As may be understood attachments 82 which abuts the trailing end of lumber 91 has caused lumber 91 to advance in the direction of motion arrow 50 from the position shown in FIG. 3. Further, the optical scanner or control system of the positioner 1 (not shown) having determined that lumber 91 has been sufficiently laterally displaced, signals the appropriate rotatable shaft of the lateral displacement means to rotate from its first (or raised) position to its second rotated (or lowered) position. For example, as illustrated in FIG. 4, rotational shaft 13 has been selected by the control system of the positioner for rotation in the direction of motion arrow 98, therefore causing a corresponding rotation of angled plate 28 also in the direction of motion arrow 98. As a result of said rotational displacement of shaft 13 and of angled plate 28, lumber 91 is no longer supported by the upper surface of said angled plate 28, and has therefore been caused to be vertically displaced downwardly in the direction of motion arrow 55, i.e it is made to move downwardly. The piece of lumber 91 will therefore be displaced downwardly a distance denoted by reference numeral 97, which may for example be approximately ¼ to ½ of an inch. Once angled plate 28 has been displaced to its second rotated position as denoted in FIG. 4, lumber 91 only rests on the advancing means 4, namely chain 45. As the advancing means 4 (i.e. chain 45) only imparts a displacement in the direction of the motion arrow 50, lumber 91 will from now on only be displaced in the direction motion arrow 50, and will therefore no longer be laterally displaced.

FIG. 5 is a close up plan view of the positioner 1 of FIG. 1, showing in addition thereto, pieces of lumber 91 and 92 being forwardly advanced in the direction of motion arrow 50 and laterally displaced in the direction of motion arrow 53. Piece of lumber 91 as shown is the same as the piece of lumber 91 of FIGS. 3 and 4. As may be seen, the positioner 1 is shown as having advancing means represented by endless chains 45 and 43 comprising thereon attachments 82 and 83. In addition, there is shown a portion of the rotatable lateral displacement means comprising rotatable shafts 14, 15, and 16 each of which comprises a number of angled plates 29, 30 and 31 respectively attached thereon. As may be seen, rotatable shafts 14, 15 and 16 are disposed beneath the endless chains 41 and 43 of the advancing means.

As may be understood, pieces of lumber 91 and 92 are disposed on and supported by the upper surface of angled plates 31 and 29 respectively, and are therefore, not vertically supported by endless chains 43 and 45. However, pieces of lumber 91 and 92 are being pushed forwardly in the direction of motion arrow 50 by attachments 82 and 83 respectively, which attachments 82 and 83 are affixed to endless chains 43 and 45. However, as may be understood, as the pieces of lumber 91 and 92 are supported by angled plates 31 and 29, the direction of travel of said pieces of lumber 91 and 92 may substantially follow the direction of angled plates 31, 30 and 29. Thus, for example, as lumber 91 is being pushed forwardly by attachments 82, it will be caused to follow the direction of angled plates 31 (i.e. it will be directed by) and will therefore be laterally displaced in the direction of motion arrow 53, such that there is a resultant vectorized direction represented by motion arrow 55. Motion arrow 55 is substantially parallel to the angle of the angled plates 31, 30 and 29.

As may be understood, piece of lumber 92 is shown to have been laterally displaced in accordance with the requirements selected by the optical scanner or control system (not shown) of the positioner 1. For illustration purposes, it is understood that piece of lumber 92 was positioned in the same position as piece of lumber 91, and after having been advanced the distance indicated by reference number 71, it has been laterally displaced a distance indicated by reference number 72.

As may further be seen, angled plates 29, 30, 31 are short angled plates, meaning that they barely long enough to overlap the next rotatable shaft, i.e. shaft 15 in the case of angled plate 31, and shaft 14 in the case of angled plated 30. Thus as may be understood, due to the short length, and therefore small mass of the angled plates, the energy required to effect the rotation of each of the rotatable shafts is kept to a minimum, therefore minimizing the size of the motor means required to rotate the shafts, and ensuring a a rapid rate of displacement of the rotatable shafts.

FIG. 6 illustrates a close up of a side elevation view of a typical angled plate 28. Said angled plate 28 is shown not affixed on its respective rotatable shaft 13. Angled plate 28 comprises adjacent its upper surfaces 110 a plurality of wheels or rollers 111, 112 and 113, which rollers are free turning and which may facilitate the displacement of lumber along the top surface 110 of said angled plate 28. As may be seen, rollers 111, 112 and 113 are not powered or motorised in any way, they are simply free turning about their axes. Angled plate 28 further comprises a stiffening member 115. As may be understood, in accordance with a general embodiment, a piece of lumber may be made to rest on rollers 111, 112, 113 and may therefore be more easily guided in the direction of the angled plate, as further illustrated in FIG. 7. Angled plate 28 further comprises cut out sections 131 and 130 which purpose is to reduce the mass of angled plate, and therefore increase the speed at which it may be rotated.

FIG. 7 illustrates a top plan view of the angled plate 28 of FIG. 5. As may be seen, angled plate 28 is angled or bent about point 121, and its distal end 116 is therefore at an angle denoted by reference number 120. As may further be seen, angled plate 28 comprises a straight section 100 and angled section 101. As may be understood, straight section 100 may be configured so as to be affixed to its respective rotatable shaft, i.e. for example rotatable shaft 13. Further, angled section 101 projects from the straight section 100, and may be for example fabricated from a single piece of steel, for example through stamping. It is understood however that the straight section 100 and angled section 101 may be connected to each other through other mean, for example through welding. Angle 120 may vary in accordance with various design parameters and in accordance with the customized or requirements of each positioner. In accordance with a general embodiment, each of the plurality of angled plates affixed to a rotatable shaft may have the same angle 120 such that a piece of lumber disposed on the top surface of the angled plate of one rotatable shaft may be laterally displaced an equal distance. However, it is understood that successive rotatable shafts, for example rotatable shafts 16, 15, 14, 13 etc . . . may each be affixed with angled plates whose angle 120 is different from one rotatable shaft to the next. For example, the angle of the angled plates may be progressively greater depending on their position further away from the feed and 51 of the positioner, thus creating a condition wherein the rate of lateral displacement of a piece of lumber is increased as the lumber is advanced through the positioner.

FIGS. 8 and 9 illustrate a plan and elevation view of an alternative embodiment of angled plate 28 of FIGS. 6 and 7. As may be seen, said embodiment does not comprises any rollers or wheels thereon. However, as may be understood, a piece of lumber may nonetheless be supported on upper surface 135 of angled plate 28, and therefore, may be guided by the angle and configuration thereof. As a further aide in the displacement of a piece of lumber supported on said angled plate 28, the upper surface 135 may be narrowed such that it may come to a thin or thinner point, i.e. akin to a knife, thus facilitating the guiding of lumber thereon.

What is claimed is:

1. A lumber positioner for selectively forwardly advancing and laterally displacing lumber therethrough comprising,
  a vertically fixed lumber advancing means for forwardly advancing lumber through the positioner, said advancing means comprising a plurality of spaced apart straight chain means, each of said chain means comprising a plurality of outwardly projecting attachments affixed thereon for imparting said lumber with motion through the positioner,
  a vertically rotatable lateral displacement guiding means for selectively laterally displacing and guiding said lumber, said lateral displacement guiding means comprising a plurality of spaced apart rotatable shafts, said rotatable shafts being rotatable between a first and a second rotated position, each said rotatable shaft comprising a plurality of angled plates affixed thereon, wherein said angled plates are configured and disposed such that when a rotatable shaft is in its first position, the uppermost surface of the angled plates affixed thereon are disposed above said chain means, and when said rotatable shaft is in its second rotated position, the uppermost surface of the angled plates affixed thereon are disposed below said chain means
  a drive means for forwardly driving said chain means,
    rotation means for selectively rotating said vertically rotatable lateral displacement means,
  the positioner being configured and disposed such that when said lumber is to be laterally displaced, at least one rotatable shaft is disposed in its first position such that the lumber is simultaneously,
    vertically supported and laterally guided in the direction of said angled plate by said upper surface of said angled plates, and
    advanced by said attachments,
  and wherein when said piece of lumber has been forwardly and laterally displaced as required, a selected rotatable shaft is rotated to its second rotated its said angled plates are downwardly displaced such that said upper surfaces of said angled plates are disposed below the chain means and such that said lumber is vertically supported by said chain means and only forwardly advanced by said attachments.

2. The lumber positioner of claim 1 wherein the motion of said lumber to be advanced through the positioner is imparted only by said attachments.

3. The lumber positioner of claim 1 wherein said attachments are free turning about their point of attachment to said chain means.

4. The lumber positioner of claim 1 wherein said straight chain means comprises elements selected from a group comprising chains, belts and conveyors.

5. The lumber positioner of claim 1 wherein said rotatable shafts are disposed from one end of the positioner to the other end of the positioner.

6. The lumber positioner of claim 1 wherein said angled plates are angled in the horizontal plane.

7. The lumber positioner of claim 1 wherein said angled plates are short angled plates.

8. The lumber positioner of claim 7 wherein each said short angled plates overlap only the next adjacent rotatable shaft.

9. The lumber positioner of claim 1 wherein said angled plates comprise at least one roller disposed thereon adjacent the upper surface thereof.

10. A lumber positioner for selectively forwardly advancing and laterally displacing lumber therethrough comprising,
- a vertically fixed, motorized, lumber advancing means for imparting motion to said lumber being advanced through said positioner, said lumber advancing means being configured and disposed such that it is in contact with said lumber irrespective of whether the lumber is being laterally displaced or not,
- a vertically rotatable, non motorized, lateral displacement means for selectively laterally displacing said lumber, said lateral displacement means comprising a plurality of spaced apart rotatable shafts, said rotatable shafts being rotatable between a first and a second rotated position, said rotatable shaft comprising a plurality of angled plates affixed thereon, wherein said angled plates are configured and disposed such that when a rotatable shaft is in its first position, the uppermost surface of the angled plates affixed thereon are disposed above the lumber advancing means, and when a rotatable shaft is in its second rotated position, the uppermost surface of the angled plates affixed thereon are disposed below the lumber advancing means,
- rotation means for vertically displacing said vertically rotatable lateral displacement means, the positioner being configured and disposed such that when said lumber is to be laterally displaced, at least one rotatable shaft is in its first position such that the lumber is simultaneously,
- vertically supported and laterally guided in the direction of said angled plate by said upper surface of said angled plates, and
- imparted with motion by said lumber advancing means, and wherein when said piece of lumber has been forwardly and laterally displaced as required, a selected rotatable shaft is rotated to its second rotated position such that its said angled plates are downwardly displaced such that said upper surfaces of said angled plates are disposed below said lumber advancing means and such that said lumber is vertically supported by said lumber advancing means and only forwardly advanced by said lumber advancing means.

11. A lumber positioner for selectively forwardly advancing and laterally displacing lumber comprising,
- a lumber advancing means for advancing the lumber through the positioner, said advancing means comprising a plurality of spaced apart straight endless chains, each of said chain having an upper run and a lower run, and further comprising a plurality of outwardly projecting attachments affixed thereon for imparting said lumber with motion throughout the positioner,
- a plurality of a spaced apart rotatable shafts disposed intermediate said upper and lower run of said endless chains, each said shaft comprising a plurality of spaced apart angled plates affixed along the length thereof, said angled plates each comprising a wear surface disposed on the upper surface thereof, a single drive means associated with said lumber advancing means
- each said rotatable shaft being individually rotatable from a first to a second rotated position, said angled plates being configured and disposed such that when each of said rotatable shaft is in said first position, said wear surface is disposed above said upper run and said lumber rest on said wear surface, and wherein said lumber advancing means advances said lumber simultaneously forwardly through the positioner and in the direction of said angled plates,
- wherein when in said second position, said shaft has been rotated such that said angled plates disposed along the length thereof have been rotated downwardly such that said lumber rest on said fixed deck and is advanced by the continuous lumber advancing means solely in the direction of the positioner.

12. The positioner of claim 11 wherein said lumber advancing means is vertically fixed.

13. The positioner of claim 11 wherein said plurality of a rotatable shafts are disposed such that the angled plates of said shafts overlap the angled plates of an adjacent shaft.

* * * * *